US007667695B2

(12) United States Patent
Yoshino

(10) Patent No.: US 7,667,695 B2
(45) Date of Patent: Feb. 23, 2010

(54) IMAGE DISPLAY APPARATUS AND INFORMATION DISPLAY APPARATUS

(75) Inventor: Yoshinari Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 11/442,342

(22) Filed: May 30, 2006

(65) Prior Publication Data

US 2006/0214929 A1 Sep. 28, 2006

Related U.S. Application Data

(62) Division of application No. 10/668,346, filed on Sep. 24, 2003, now Pat. No. 7,084,863.

(30) Foreign Application Priority Data

Sep. 26, 2002 (JP) ............................ 2002-281137
Sep. 18, 2003 (JP) ............................ 2003-325656

(51) Int. Cl.
*G06F 3/038* (2006.01)

(52) U.S. Cl. ........................ 345/204; 345/211; 313/495

(58) Field of Classification Search ................. 313/495, 313/496; 315/169.3; 345/204, 211
See application file for complete search history.

(56) References Cited

U.S. PATENT DOCUMENTS

| | | | | |
|---|---|---|---|---|
| 6,114,804 | A | 9/2000 | Kawase et al. | 313/495 |
| 6,476,547 | B1 | 11/2002 | Kawase | 313/495 |
| 6,528,939 | B1 | 3/2003 | Kawase | 313/495 |
| 6,603,255 | B2 * | 8/2003 | Takahashi | 313/496 |
| 6,831,402 | B2 | 12/2004 | Kamiguchi | 313/495 |
| 6,879,096 | B1 * | 4/2005 | Miyazaki et al. | 313/495 |
| 2002/0047574 | A1 | 4/2002 | Kojima et al. | 315/169.3 |
| 2003/0025443 | A1 * | 2/2003 | Kamiguchi | 313/495 |
| 2003/0085651 | A1 * | 5/2003 | Takahashi | 313/496 |
| 2003/0102798 | A1 * | 6/2003 | Ohnishi | 313/495 |
| 2003/0164675 | A1 * | 9/2003 | Ando | 313/495 |

FOREIGN PATENT DOCUMENTS

| | | |
|---|---|---|
| JP | 52-144264 | 1/1977 |
| JP | 56-21231 | 5/1981 |
| JP | 59-096751 | 6/1984 |
| JP | 5-6748 | 1/1993 |
| JP | 6-52812 | 2/1994 |
| JP | 7-131125 | 5/1995 |
| JP | 10-64456 | 3/1998 |
| JP | 10-092345 | 4/1998 |
| JP | 10-326581 | 12/1998 |
| JP | 2000-251779 | 9/2000 |
| JP | 2000-251801 | 9/2000 |
| JP | 2000-251981 | 9/2000 |

* cited by examiner

*Primary Examiner*—Amare Mengistu
*Assistant Examiner*—Dmitriy Bolotin
(74) *Attorney, Agent, or Firm*—Fitzpatrick, Cella, Harper & Scinto

(57) ABSTRACT

In a display panel adopting the structure that conductive members surrounding a potential introducing terminal are disposed on both sides of a substrate, the potential introducing terminal is applied with a potential higher than those applied to the conductive members and a discharge suppressing mechanism is provided between the potential introducing terminal and at least the conductive member mounted on the surface of the substrate constituting an outer surface of the display panel.

8 Claims, 6 Drawing Sheets

FIG. 6
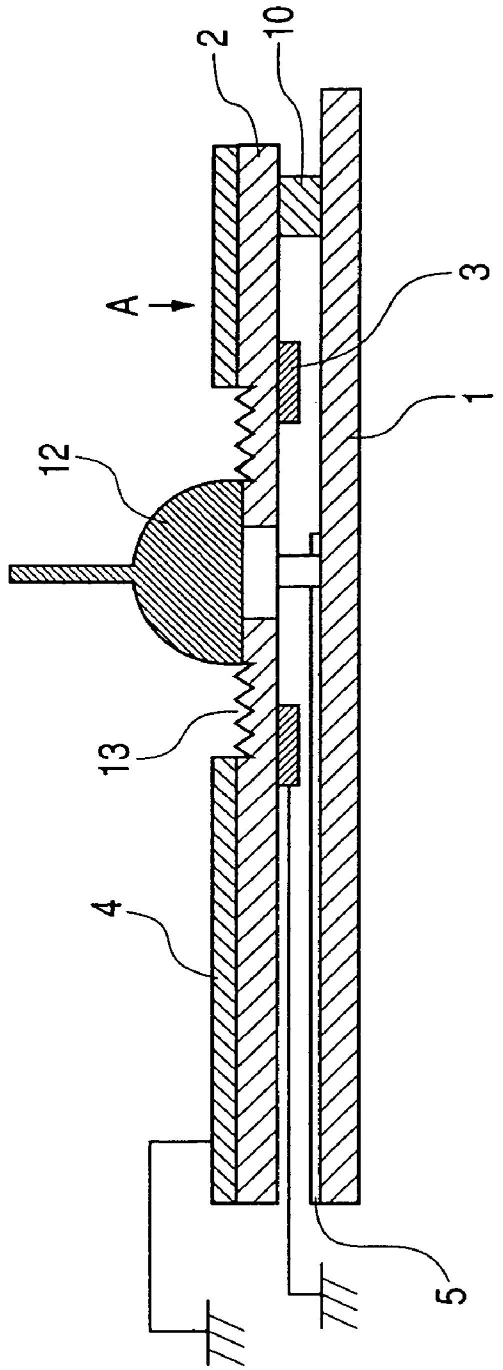
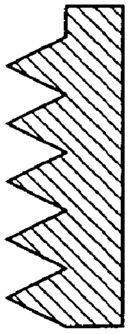
FIG. 7A
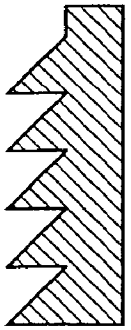
FIG. 7B
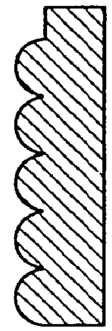
FIG. 7C
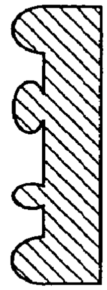
FIG. 7D

IMAGE DISPLAY APPARATUS AND INFORMATION DISPLAY APPARATUS

This is a division of application Ser. No. 10/668,346, filed on Sep. 24, 2003.

BACKGROUND OF THE INVENTION

1. Field of the Invention

The present invention relates to an image display apparatus, and more particularly to an image display apparatus having a potential introducing terminal. The invention also relates to an information display apparatus such as a television using the image display apparatus.

2. Related Background Art

An anode cap of an image display apparatus such as a CRT is a structural component for connecting a high voltage cable to an anode button of a CRT. A conventional anode cap has the structure that a metal body is covered with an insulating cover (Refer for example to Japanese Patent Publication No. 56-21231, Japanese Patent Application Laid-open Nos. 10-64456, and 2000-251981).

FIG. 10 is a cross sectional view showing a mount state of a conventional anode cap on an outer wall of a CRT. Referring to FIG. 10, reference numeral 41 represents a high voltage lead wire, reference numeral 42 represents a metal body, reference numeral 43 represents a contact piece, reference numeral 44 represents an insulating cover, reference numeral 45 represents a high voltage lead wire holder portion, reference numeral 46 represents a bowl portion, reference numeral 47 represents an anode cup, and reference numeral 48 represents an outer wall of CRT. The contact piece 43 fixed to the metal body 42 is provided at the front end of the high voltage lead wire 41. This contact piece 43 is electrically connected to a core wire of the high voltage lead wire 41.

The insulating cover 44 has the bowl portion 46 and the high voltage lead wire holder portion 45 which accommodates and holds the high voltage lead wire 41 at the position where the contact piece 43 is coupled. A through hole for the contact piece 43 is formed at the bottom of the bowl portion 46. The contact piece 43 is made of a bent linear conductor having an elasticity. Two contact pieces 43 are extend in the bowl portion 46. The insulating cover 44 is made of elastic material such as silicon rubber.

The outer wall 48 of CRT is generally made of glass. The inner surface of the outer wall 48 is formed with an anode conductive film (not shown). The anode conductive film and the bottom of the anode cup 47 is in contact with each other. The bowl portion 46 widely covers the connection area between the contact piece 43 and anode cup 47 to ensure insulating protection.

As described above, the conventional anode cap has the structure that the metal body is covered with the insulating cover. A distance between the border of the insulating cover and the metal body has been set to a distance sufficient for preventing creeping discharge when a high voltage is applied. There is therefore less necessity for adopting a special process or structure for preventing creeping discharge with nearby components.

Irregular projections have been invented as the means for improving a dielectric breakdown voltage between two conductors (refer for example to Japanese Patent Application Laid-open Nos. 05-006748, 06-052812 and 07-131125). The means for improving a dielectric breakdown voltage by using the irregular projections disclosed in these applications can be applied to a high voltage applying portion of an image display apparatus when the present invention is reduced in practice.

SUMMARY OF THE INVENTION

The present inventor has studied an image display apparatus having the structure that conductive members are disposed, surrounding a potential introducing terminal passing through a substrate, on both inner and outer surfaces of the substrate. A potential applied to the potential introducing terminal is higher than the potentials applied to the two conductive members surrounding the potential introducing terminal on both inner and outer surfaces of the substrate.

According to the vigorous studies by the present inventor, it has been found that an unexpected specific theme is associated with the structure that conductive members are disposed, surrounding a potential introducing terminal passing through a substrate, on both inner and outer surfaces of the substrate. One of themes of this invention is to realize an image display apparatus capable of solving this specific theme and providing the structure free of such a specific theme.

According to the invention of the present application, an image display apparatus comprises: a substrate constituting a display panel; a potential introducing terminal for introducing a potential into the display panel, the potential introducing terminal being mounted passing through the substrate; a first conductive member surrounding the potential introducing terminal on a surface of the substrate on an inner side of the display panel; and a second conductive member surrounding the potential introducing terminal on a surface of the substrate on a side opposite to the inner side of the display panel, wherein a potential applied to the potential introducing terminal is higher than potentials applied to the first and second conductive members; and wherein the image display apparatus further comprises a charge suppressing structure formed between the potential introducing terminal and the second conductive member, the discharge suppressing structure suppresses discharge between the potential introducing terminal and the second conductive member.

According to the invention of the present application, an image display apparatus comprises: a substrate constituting a display panel; a potential introducing terminal for introducing a potential into the display panel, the potential introducing terminal being mounted passing through the substrate; a first conductive member surrounding the potential introducing terminal on a surface of the substrate on an inner side of the display panel; and a second conductive member surrounding the potential introducing terminal on a surface of the substrate on a side opposite to the inner side of the display panel, wherein a potential applied to the potential introducing terminal is higher than potentials applied to the first and second conductive members; and wherein the image display apparatus further comprises an insulating substance covering an exposed surface between the potential introducing terminal and the second conductive member.

According to the invention of the present application, an image display apparatus comprises: a substrate constituting a display panel; a potential introducing terminal for introducing a potential into the display panel, the potential introducing terminal being mounted passing through the substrate; a first conductive member surrounding the potential introducing terminal on a surface of the substrate on an inner side of the display panel; and a second conductive member surrounding the potential introducing terminal on a surface of the substrate on a side opposite to the inner side of the display panel, wherein: a potential applied to the potential introducing terminal is higher than potentials applied to the first and second conductive members; and wherein the image display apparatus further comprises projections formed on an exposed surface between the potential introducing terminal and the second conductive member.

BRIEF DESCRIPTION OF THE DRAWINGS

FIG. 6 is a cross sectional view of a high voltage applying portion according to a second embodiment of the invention which shows best the characteristics of the invention.

FIGS. 7A, 7B, 7C and 7D are cross sectional views showing the characteristics of irregular patterns of the second embodiment of the invention.

DETAILED DESCRIPTION OF THE PREFERRED EMBODIMENTS

Figure 1:
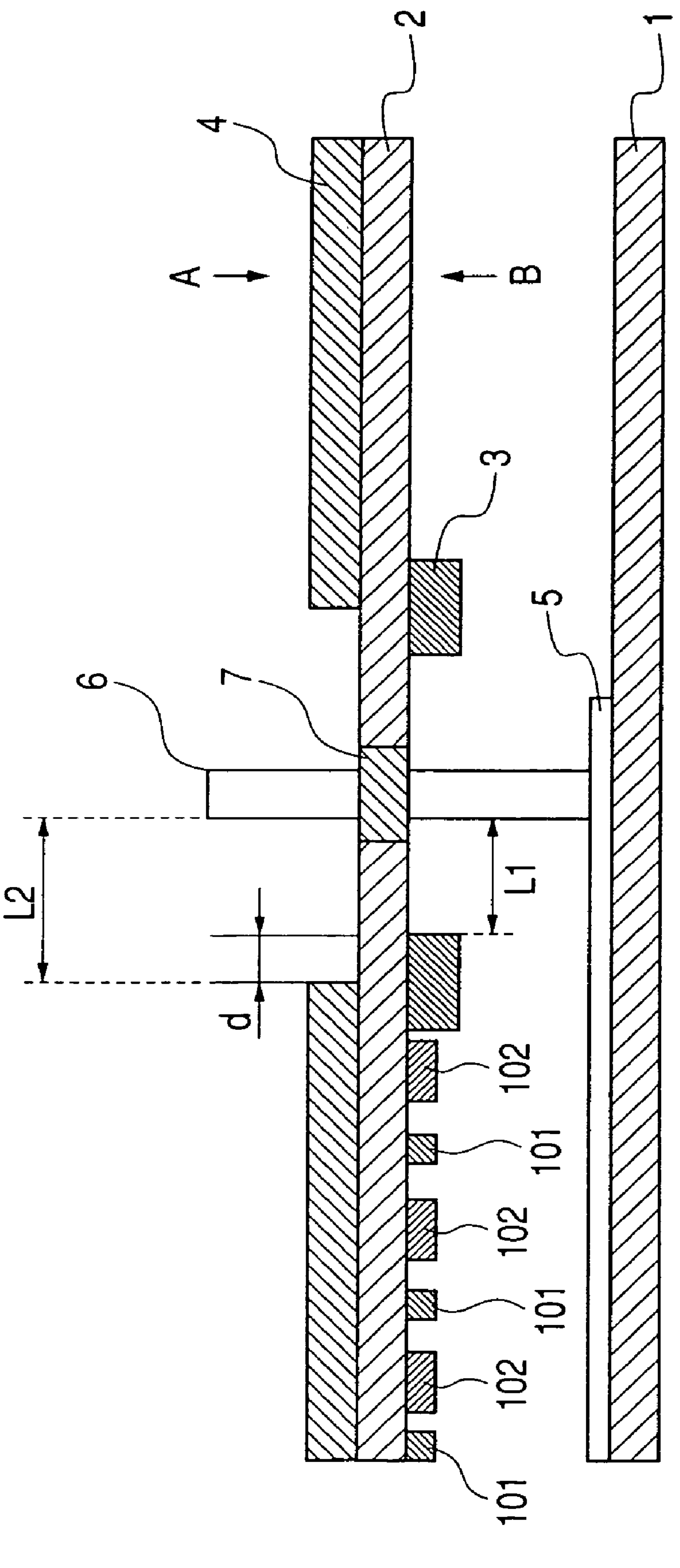
FIG. 1 is a cross sectional view conceptually showing the structure of a potential introducing terminal and first and second conductive members according to the present invention.
Figure 2:
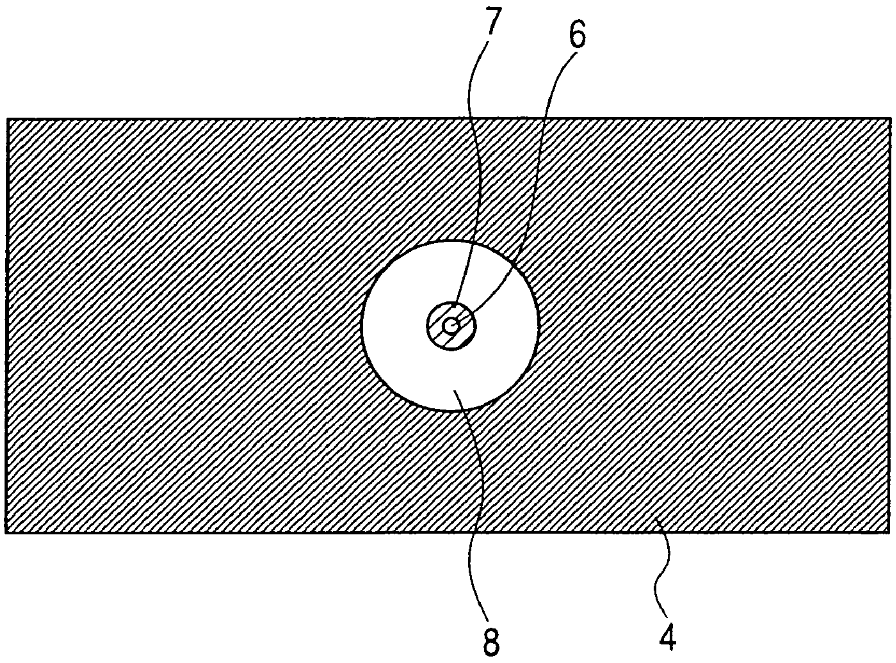
FIG. 2 is a plan view as viewed along an arrow direction A shown in FIG. 1.
Figure 3:
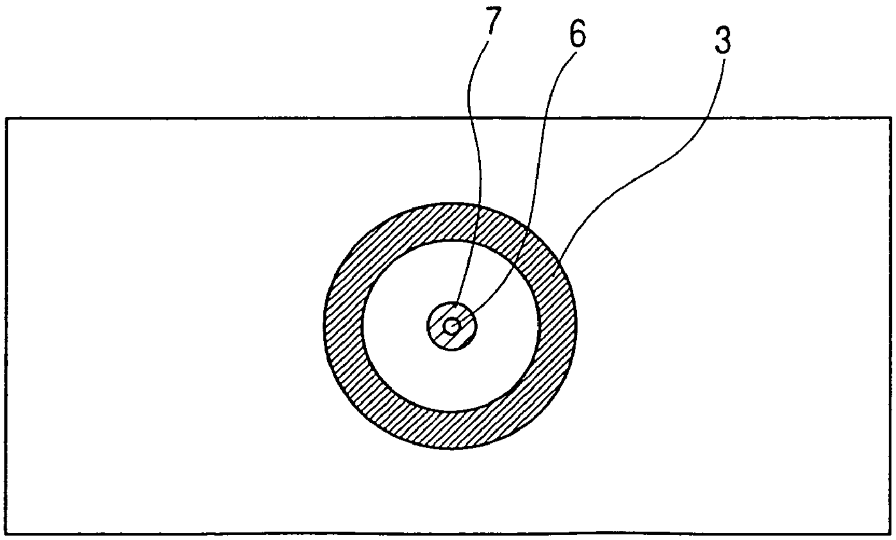
FIG. 3 is a plan view as viewed along an arrow direction B shown in FIG. 1.

FIGS. 1, 2 and 3 are a cross sectional view and plan views conceptually showing the structure of a potential introducing terminal 6 and first and second conductive members 3 and 4 according to the invention. FIG. 2 is a plan view as viewed along an arrow direction A shown in FIG. 1, and FIG. 3 is a plan view as viewed along an arrow direction B shown in FIG. 1.

A potential (preferably a ground potential) applied to the first conductive member 3 is different from a potential (for example, an anode potential) applied to the potential introducing terminal 6. In this embodiment, electron emitting elements 101 formed in a display panel are used as display elements and an electrode 5 applied with a potential for accelerating electrons emitted from the electron emitting elements 101 are formed in the display panel, in this example, on a first substrate 1. The potential applied to the electrode 5 via the potential introducing terminal 6 is called the anode potential. Since there is a potential difference, the first conductive member 3 is spaced apart by a predetermined distance from the potential introducing terminal 6. Since a potential (preferably a ground potential) applied to the second conductive member 4 is different from a potential (for example, an anode potential) applied to the potential introducing terminal 6 is different, the second conductive member 4 is spaced apart by a predetermined distance from the potential introducing terminal 6. The first conductive member 3 is disposed in contact with the inner surface of a second substrate 2 (surface of the display panel on the inner side), whereas the second conductive member 4 is disposed in contact with the outer surface of the second substrate 2 (surface of the display panel on the outer side). Reference numeral 102 represents wiring lines for driving the display elements 101. The electron emitting elements 101 are disposed in a matrix shape and the wiring lines 102 constitute a matrix wiring pattern.

The longest distance between the first conductive member 3 and potential introducing terminal 6 is limited because various constituent elements such as wiring lines and electrode are formed on the inner surface of the substrate 2. In the display panel having the substrate 2 of a flat shape, or both the substrates 1 and 2 of a flat shape, it is desired to shorten the distance between the first conductive member 3 and potential introducing terminal 6. The inner side of the substrate 2 means the inner side of the display panel. In this embodiment, the electron emitting elements constituting the display elements are disposed on the inner side of the substrate 2 in a matrix shape, and the matrix wiring lines for connecting the electron emitting elements in a matrix pattern are also disposed. The first conductive member 3 is disposed in an area where the display elements, wiring lines and the potential introducing terminal are not formed. The first conductive member 3 is disposed in such a manner that the area occupied by the potential introducing terminal 6 and first conductive member 3 becomes as small as possible.

On the other hand, the constraints of the second conductive member 4 and the potential introducing terminal 6 to be caused by wiring lines, electrodes and the like are not so large as the constraints of the distance between the first conductive member 3 and potential introducing terminal 6, so that a sufficient distance is ensured between the second conductive member 4 and potential introducing terminal 6.

The inner space between the first and second substrates of the display panel is a depressured atmosphere and the first conductive member 3 is required to be formed between the potential introducing terminal and the display elements and wiring lines for driving the display elements, as described earlier. In consideration of these, a display panel was manufactured under the conditions that L1/V1 was set smaller than 1 mm/kV and that L2/V2 was larger than 1 mm/kV by considering that the second substrate was exposed to the external air, wherein: L1 is a shortest distance between the first conductive member 3 and potential introducing terminal 6; V1 is the absolute value of a potential difference between the potential applied to the first conductive member 3 and the potential applied to the potential introducing terminal 6; L2 is a shortest distance between the second conductive member 4 and potential introducing terminal 6; and V2 is the absolute value of a potential difference between the potential applied to the second conductive member 4 and the potential applied to the potential introducing terminal 6. This display panel was manufactured for the comparison purposes and is not shown in the drawing. The operation of this display panel was checked and it has been found that the operation becomes unstable. The present inventor has vigorously studied the reason of this unstable operation. It has been found that abnormal discharge occurs if the absolute value of a projection distance d between the end of the first conductive member 3 on the potential introducing terminal 6 side and the end of the second conductive member 4 on the potential introducing terminal 6 side becomes large, i.e., if the absolute value of a difference between L1 and L2 becomes large. The reason for this may be ascribed to that if the potential distribution between the potential introducing terminal 6 and second conductive member 4 is very different from the potential distribution between the potential introducing terminal 6 and first conductive member 3, the potential distributions on both sides (outer and inner surfaces) of the second substrate is very different and this difference results in an unstable operation. It has also been found that although this unstable operation depending upon the projection distance d can be suppressed to some degree if both L1/V1 and L2/V2 are 1 mm/kV or smaller, it becomes conspicuous if the projection distance d representative of the absolute value of a difference between L1 and L2 becomes large to some degree and at least L2/V2 is larger than 1 mm/kV.

The present inventor who have found this specific theme not found to date has studied the structure having a small L2 which can be expected to solve this specific theme. However, if L2 is made small, although the unstable operation depending upon the projection distance d can be easily suppressed, discharge occurs frequently between the second conductive member 4 and potential introducing terminal 6. The influence of this discharge becomes large if V2 is 5 kV or higher.

In the embodiments to be described below, the discharge suppressing structure is provided at least between the second conductive member 4 and potential introducing terminal 6.

Preferred embodiments of the invention will be described specifically with reference to the accompanying drawings.

First Embodiment

Figure 4:
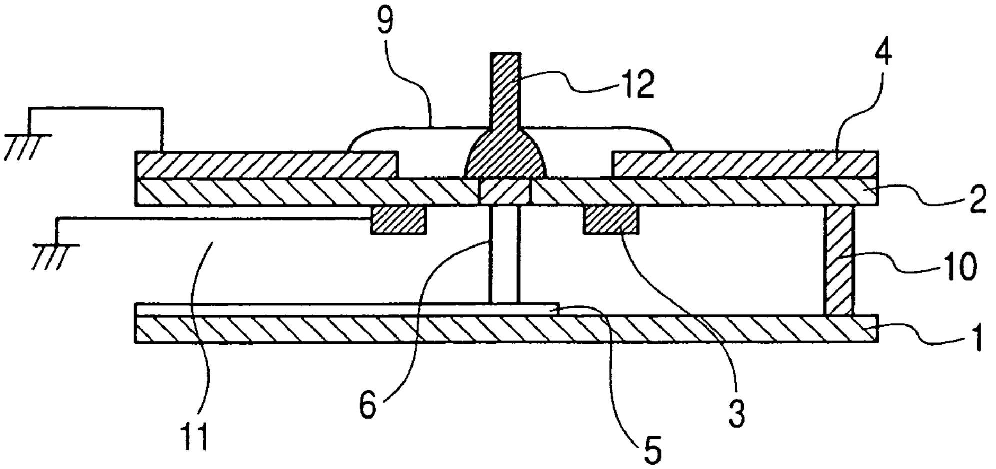
FIG. 4 is a cross sectional view of a high voltage applying portion according to a first embodiment of the invention which shows best the characteristics of the invention.

FIG. 4 is a cross sectional view of a high voltage application portion which shows best the characteristics of the invention.

Referring to FIG. 4, reference numeral 1 represents a substrate, or front glass plate (face plate) the inner surface of which is formed with a black stripe film and a phosphor film of each of R, G and B colors and a conductive film. Reference numeral 2 represents a substrate or back glass plate (rear plate) the surface on the front glass plate 1 side of which is formed with electron emitting elements 101 and matrix wiring lines 102 with an insulating layer being sandwiched therebetween. The electron emitting elements 101 and wiring lines 102 are similar to those shown in FIG. 1, and they are not drawn in FIG. 4. Reference numeral 11 represents the inner space of the display panel, the inner space being a vacuum gap, and reference numeral 10 represents a frame which is bonded to the front glass plate 1 and back glass plate 2 to form the vacuum gap 11. Reference numeral 12 represents a cable for connecting together a potential introducing terminal 6 and an external power source, the cable made of a metal member being used for applying a high voltage. The potential supplied from the external power source is applied to the potential introducing terminal via the cable 12 and supplied to a conductive film 5 formed on the inner surface of the substrate 1 via the potential introducing terminal 6. Reference numeral 9 represents an insulating member disposed for providing a sufficiently high breakdown voltage, the insulating member being made of silicon resin. This insulating member 9 constitutes a discharge suppressing structure. Reference numeral 3 represents a first conductive member and reference numeral 4 represents a second conductive member, the first and second conductive members 3 and 4 being grounded.

The high voltage applying portion constructed as above will be described in detail.

The first conductive member 3 formed on the inner surface of the rear plate 2 is made of general metal such as Al, Cu, Ag, Au, Pt and Ni or conductive material such as ITO. The second conductive member 4 formed on the outer surface of the rear plate 2 is also made of general metal such as Al, Cu, Ag, Au, Pt and Ni or conductive material such as ITO. The first and second conductive members are made of one of these metals by photolithography, vacuum vapor deposition, printing, sputtering, chemical vapor deposition, spinning and the like. In this embodiment, the first conductive member is made of Ag coated by printing and the second conductive member is made of an ITO film deposited by sputtering. This structure is formed on the assumption that 15 keV is applied to the potential introducing terminal. Since a potential of 0 V is applied to both the first and second conductive members 3 and 4, V1 and V2 are both 15 keV.

As shown in FIG. 3, the first conductive member 3 has a concentric ring shape surrounding the potential introducing terminal 6. The distance L1 between the potential introducing terminal 6 and first conductive member 3 was set to 5 mm. The shape of the first conductive member 3 surrounding the potential introducing terminal 6 is not limited to the ring shape, but it may not surround completely the potential introducing terminal and may have a partial slit. In order to suppress discharge efficiently, it is preferable that the first conductive member 3 has a ring shape so that the distance between each point of the first conductive member 3 and the potential introducing terminal 6 becomes equal and the first conductive member 3 completely surrounds the potential introducing terminal 6 without any slit.

Figure 5:
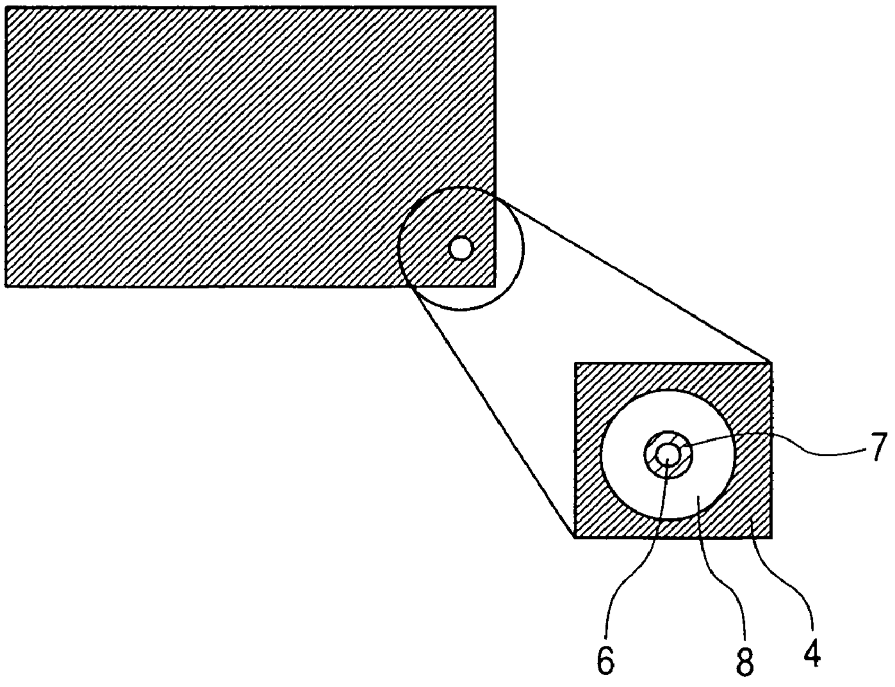
FIG. 5 shows a plan view and a partially enlarged view of the first embodiment.

The second conductive member 4 has an area 8 circularly punched out (FIG. 5). The potential introducing terminal 7 made of metal material is disposed at the center of the punched area, the potential introducing terminal 6 being electrically connected to the inner surface of the face plate. The cable 12 is bonded to the metal material of the potential introducing terminal 6 by electric bonding material such as solder and In. The distance L2 from the outer periphery of the potential introducing terminal 6 to the ITO film was set to 13 mm. The material of the potential introducing terminal 6 is general metal such as Al, SUS and Cu, and the surface of the potential introducing terminal 6 may be a metal film of Au, nickel or the like.

The first and second conductive members 3 and 4 are electrically grounded.

The cable 12 has an insulating cover covering the outer periphery of the potential introducing terminal 6. In order to improve the creeping breakdown voltage, the insulating member 9 of silicon resin is sealed between the outer periphery of the insulating cover and the second conductive member 4. The sealing range completely covers the punched area 8. The silicon resin is deposited in such a manner that any gap will not be formed between the silicon resin and the insulating cover of the cable 12 and between the silicon resin and the second conductive member 4. The silicon resin is also deposited in such a manner that the insulating surface of the substrate 2 will not be exposed between the second conductive member 4 and the insulating cover of the cable 12. Since the insulating surface of the substrate 2 is not exposed, it is possible to suppress discharge from sharp protrusions existing on the outer periphery of the insulating cover of the cable and on the edge of the punched area 8 of the second conductive member 4, resulting in the improvement on the breakdown voltage. The insulating member 9 formed between the potential introducing terminal 6 and second conductive member 4 is disposed in such a manner that it covers at least a partial upper surface of the second conductive member 4, particularly a partial upper surface of the second conductive member 4 near the potential introducing terminal 6. With this layout, discharge can be suppressed further.

The inventor confirmed that no discharge occurred during 1000 H while 15 kV was continuously applied in the atmospheric air to the high voltage application unit having the above-described structure. It was also confirmed that it was possible to suppress the unstable operation of the panel display having the same structure as that of the first conductive member 3 and a large L2 of 16 mm of the punched area of the second conductive member 4.

More specifically, the unstable operation was able to be improved by reducing the absolute value of a difference between L1 and L2, and the stable operation was able to be realized by disposing the silicon resin constituting the discharge suppressing structure between the potential introducing terminal 6 and its nearby second conductive member 4. It was possible to reliably prevent creeping discharge even if the relation between the distance between the second conductive member 4 and potential introducing terminal 6 and the potential difference therebetween is 1 mm/kV or small.

Second Embodiment

FIG. 6 is a cross sectional view of a high voltage application portion according to the second embodiment which shows the characteristics of the invention. An irregular portion 13 constituting the discharge suppressing structure is formed in a gap portion between the second conductive member 4 and potential introducing terminal 6.

Figure 8A:
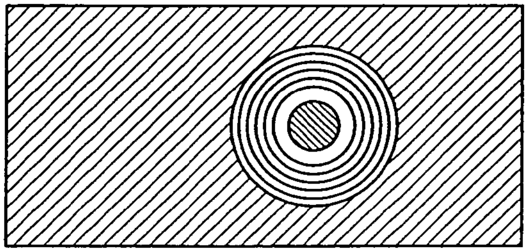
FIGS. 8A and 8B are plan views of projections of the second embodiment of the invention.
Figure 8B:
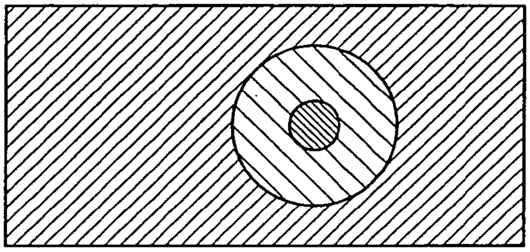

FIGS. 7A, 7B, 7C and 7D are cross sectional views showing examples of the shapes of the irregular portion 13. FIGS. 8A and 8B are plan views as viewed along an arrow direction A shown in FIG. 6. FIG. 8A shows the irregular portion having concentric projections and FIG. 8B shows the irregular portion having random projections. The projections are formed by molding, etching, sand blasting or the like. By forming such projections, the creeping distance between the potential introducing terminal 6 and second conductive member 4 becomes long so that the dielectric breakdown voltage can be improved. It is possible to elongate the creeping distance by making the projections high. In this case, it is necessary to consider the strength of the glass plate.

By forming the projections in the gap portion between the potential introducing terminal 6 and second conductive member 4, the creeping distance can be elongated and the dielectric breakdown voltage can be improved.

Third Embodiment

Figure 9:
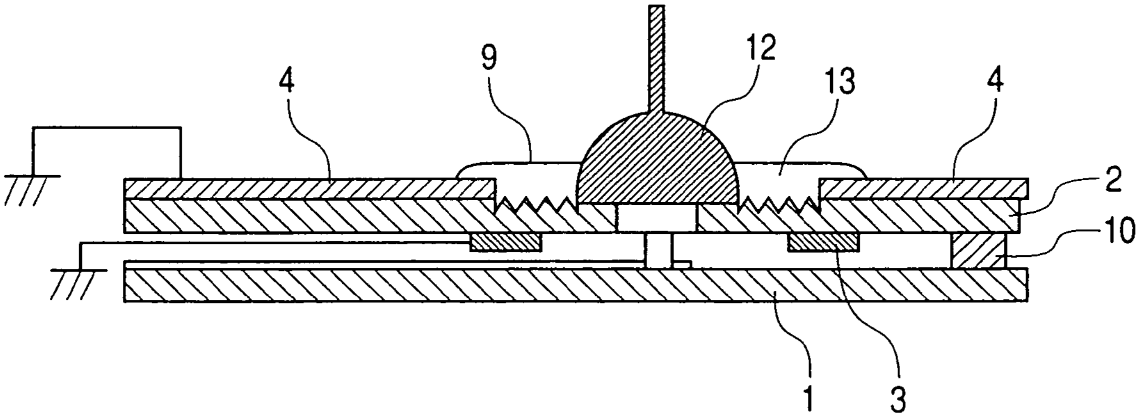
FIG. 9 is a cross sectional view of a high voltage applying portion according to a third embodiment of the invention which shows best the characteristics of the invention.
Figure 10:
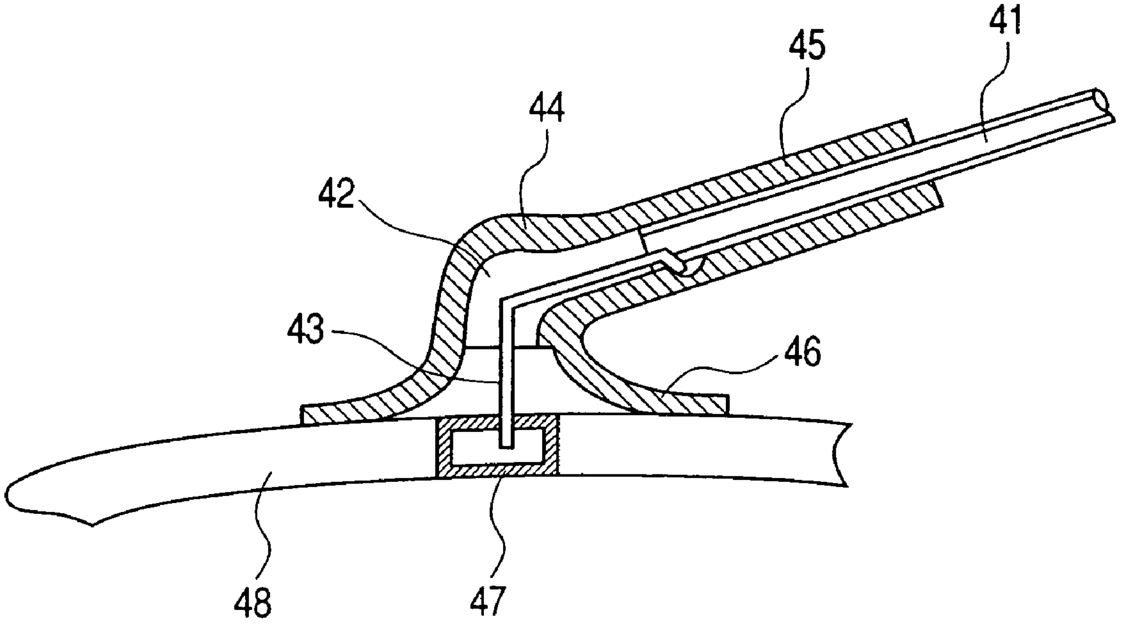
FIG. 10 is a cross sectional view showing a conventional anode cap mounted on an outer wall of a CRT.

FIG. 9 is a cross sectional view of a high voltage application portion according to the third embodiment which shows the characteristics of the invention. The irregular portion 13 of the second embodiment is covered with the silicon resin (insulator) 9 used by the first embodiment to completely shield the projections without any space. The dielectric breakdown voltage between the potential introducing terminal 6 and second conductive member 4 is raised by forming the projections and also by completely covering the projections with silicon resin, to thereby provide the structure which enhances the discharge suppressing effects.

Fourth Embodiment

Figure 11:
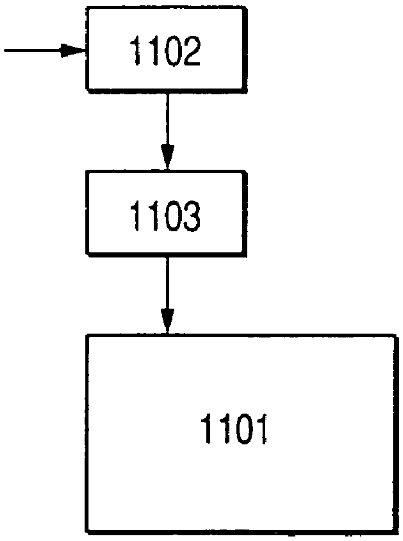
FIG. 11 is a diagram illustrating a fourth embodiment of the invention.

FIG. 11 is a schematic diagram showing the structure of an information display apparatus such as a computer monitor and a television using the image display apparatus described in the first to third embodiments.

Reference numeral 1101 represents an image display apparatus including the display panel and the cable 12 to be connected to the potential introducing terminal 6 of the display panel. Reference numeral 1102 represents a signal input circuit including a tuner and a signal input terminal input to which are a signal from a computer, a signal of television broadcast, and a signal from a network such as the Internet and a local area network. Reference numeral 1103 represents a signal processing circuit for processing a signal applied to the signal input terminal and generating a signal to be displayed on the image display apparatus 1101. A signal input from the external to the signal input unit 1102 is precessed by the signal processing circuit 1103 and input to the image display apparatus 1101. In accordance with the signal input to the image display apparatus 1101, an image is displayed on the display panel of the image display apparatus 1101.

According to the invention, it is possible to suppress the unstable operation of the display panel having the structure that the first and second conductive members are disposed on both sides of the substrate, surrounding the potential introducing terminal and to suppress discharge between the potential introducing terminal and conductive member having such a structure.

What is claimed is:

1. An image display apparatus comprising:

a substrate comprising a display panel;

a potential introducing terminal mounted passing through said substrate, for introducing a potential into said display panel;

a first conductive member surrounding said potential introducing terminal on a surface of said substrate on an inner side of said display panel; and a second conductive member surrounding said potential introducing terminal on a surface of said substrate on a side opposite to said inner side of said display panel, wherein a potential applied to said potential introducing terminal is higher than potentials applied to said first and second conductive members;

wherein said second conductive member is positioned apart from said potential introducing terminal by a distance larger than a distance between said first conductive member and said potential introducing terminal; and wherein a surface of said substrate between said potential introducing terminal and said second conductive member and an end of said second conductive member on the side of said potential introducing terminal are covered with an insulating substrate.

2. The image display apparatus according to claim 1, wherein L2/V2 is 1 mm/kV or less, where L2 is the shortest distance between said second conductive member and said potential introducing terminal and V2 is an absolute value of a difference in potential between the potential applied to said second conductive member and the potential applied to said potential introducing terminal.

3. The image display apparatus according to claim 2, wherein L1/V1 is 1 mm/kV or less, where L1 is the shortest distance between said first conductive member and said potential introducing terminal and V1 is an absolute value of a difference in potential between the potential applied to said first conductive member and the potential applied to said potential introducing terminal.

4. An information display apparatus comprising:

a signal input circuit to which information to be displayed is inputted; and said image display apparatus as recited in claim 1, said image display apparatus displaying an image in accordance with a signal inputted to said signal input circuit.

5. An image display apparatus comprising:

a substrate comprising a display panel;

a potential introducing terminal mounted passing through said substrate, for introducing a potential into said display panel;

a first conductive member surrounding said potential introducing terminal on a surface of said substrate on an inner side of said display panel; and a second conductive member surrounding said potential introducing terminal on a surface of said substrate on a side opposite to said inner side of said display panel, wherein a potential applied to said potential introducing terminal is higher than potentials applied to said first and second conductive members;

wherein said second conductive member is positioned apart from said potential introducing terminal by a distance larger than a distance between said first conductive member and said potential introducing terminal; and wherein there are projections on an exposed surface of said substrate between said potential introducing terminal and said second conductive member.

6. The image display apparatus according to claim 5, wherein L2/V2 is 1 mm/kV or less, where L2 is the shortest distance between said second conductive member and said potential introducing terminal and V2 is an absolute value of a difference in potential between the potential applied to said second conductive member and the potential applied to said potential introducing terminal.

7. The image display apparatus according to claim 6, wherein L1/V1 is 1 mm/kV or less, where L1 is the shortest distance between said first conductive member and said potential introducing terminal and V1 is an absolute value of a difference in potential between the potential applied to said first conductive member and the potential applied to said potential introducing terminal.

8. An information display apparatus comprising:

a signal input circuit to which information to be displayed is inputted; and said image display apparatus as recited in claim 5, said image display apparatus displaying an image in accordance with a signal inputted to said signal input circuit.

* * * * *